US012521943B2

(12) United States Patent
Mccutcheon et al.

(10) Patent No.: US 12,521,943 B2
(45) Date of Patent: Jan. 13, 2026

(54) 3D FABRICATED OBJECTS WITH LATTICE STRUCTURES HAVING TUBES

(71) Applicant: Peridot Print LLC, Palo Alto, CA (US)

(72) Inventors: James Andrew Mccutcheon, Vancouver, WA (US); David Christopher Woodlock, Vancouver, WA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 473 days.

(21) Appl. No.: 18/031,127

(22) PCT Filed: Oct. 16, 2020

(86) PCT No.: PCT/US2020/056099
§ 371 (c)(1),
(2) Date: Apr. 10, 2023

(87) PCT Pub. No.: WO2022/081173
PCT Pub. Date: Apr. 21, 2022

(65) Prior Publication Data
US 2024/0001619 A1  Jan. 4, 2024

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 50/02* (2014.12); *G06T 19/20* (2013.01); *G06T 2219/2021* (2013.01)

(58) Field of Classification Search
CPC ..... B29C 64/393; B29C 64/386; B33Y 50/02; B33Y 30/00; B33Y 50/00; B33Y 10/00;
(Continued)

(56) References Cited

U.S. PATENT DOCUMENTS 9,565,053 B2  2/2017  Kadota
9,811,620 B2  11/2017  Ruto et al.
(Continued)

FOREIGN PATENT DOCUMENTS

WO  2017/205555 A1  11/2017
WO  2019/050842 A1  3/2019
WO  2020/086372 A1  4/2020

*Primary Examiner* — Michael J Brown
(74) *Attorney, Agent, or Firm* — Michael Dryja

(57) ABSTRACT

According to examples, a processor may access a digital model of a portion of an object and identify a lattice structure to be formed in an interior of the digital model, in which the identified lattice structure is to provide the portion with a predefined property and is defined by an equation that includes constants. The processor may also determine values of the constants that result in surfaces of the lattice structure forming tubes, determine locations at which the identified equation with the determined values of the constants intersects with the defined boundaries, and modify the digital model to include the lattice structure with the surfaces forming tubes and cap ends added at determined locations to close open edges of the tubes at the determined locations, in which the portion is to be fabricated by a 3D fabrication system according to the modified digital model to have the predefined property.

15 Claims, 4 Drawing Sheets

(51) Int. Cl.
*G06T 19/20* (2011.01)
*B22F 3/11* (2006.01)

(58) Field of Classification Search
CPC .... G06T 19/20; G06T 2219/2021; B22F 3/11; B22F 5/10; B22F 2999/00; B22F 10/80
USPC .......................................................... 700/98
See application file for complete search history.

(56) References Cited

U.S. PATENT DOCUMENTS

| | | |
|---|---|---|
| 10,216,172 B2 | 2/2019 | Arisoy et al. |
| 10,237,448 B2 | 3/2019 | Asakura |
| 10,631,953 B2 | 4/2020 | Wen |
| 2015/0370926 A1* | 12/2015 | Savage ................... G06F 30/00 703/1 |
| 2017/0343984 A1* | 11/2017 | Czinger ................. B33Y 50/02 |

* cited by examiner

3D FABRICATED OBJECTS WITH LATTICE STRUCTURES HAVING TUBES

BACKGROUND

Lattice structures may generally fall into two categories. Beam-based lattices and surface-based lattices. Beam-based lattices may be defined by curves and beam characteristics and surface-based lattices may be defined by trigonometric functions and by wall thicknesses. Surface-based lattices may also be called triply periodic minimal surfaces (TPMS) as the surfaces may repeat in every direction, which may give them crystalline-like symmetries.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
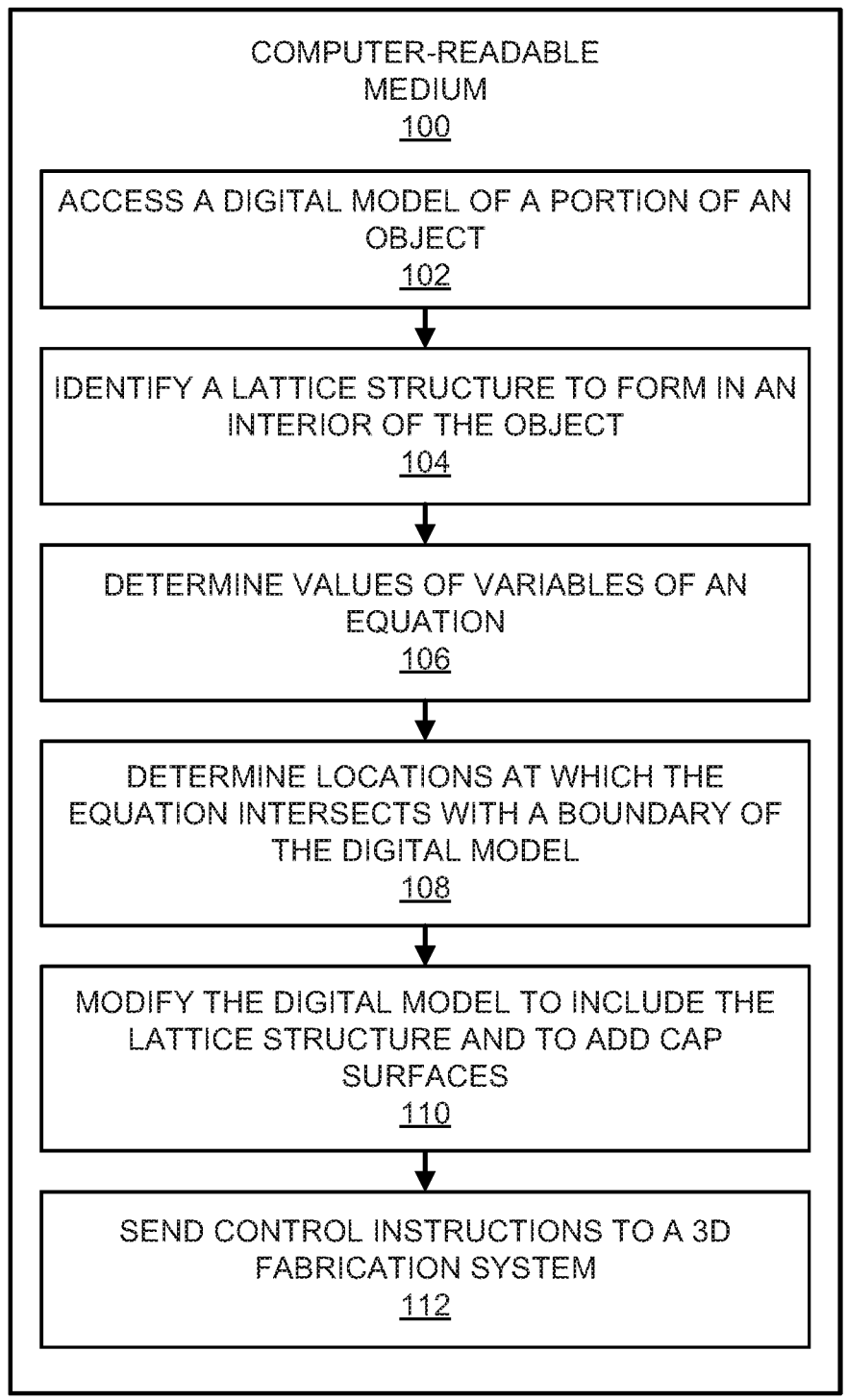
FIG. 1 shows a block diagram of an example computer-readable medium that may have stored thereon computer-readable instructions for modifying a digital model of a portion of an object to include a lattice structure with surfaces that form hollow tubes with capped ends, in which the lattice structure is to provide the portion of the object with a predefined property.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Beam-based lattice structures may include a plurality of nodes that may be created where the beams intersect one another, which may result in sharp corners and edges at the nodes. The sharp corners and edges may create stress concentrations at the intersections. As a result, when the beam-based lattice structures are compressed, the material in the nodes may experience greater stress than the other sections of the lattice structures, which may result in reduced durability, e.g., premature failures, of the lattice structures. In contrast, surface-based lattice structures may be formed of a plurality of sheets and may thus have better durability than beam-based lattice structures. However, surface-based lattice structures may be relatively more stiff than beam-based lattice structures and may thus not be suitable for applications in which the lattice structures are to be compressible.

Disclosed herein are apparatuses and methods for modifying a digital model of a portion of an object to be fabricated by a 3D fabrication system, in which the digital model may be modified to include a lattice structure with surfaces that form tubes. The lattice structure with the tubes may be fabricated into an interior portion of the object to provide the object with a predefined property, such as a predefined compression level, a predefined stiffness level, a predefined porosity level, a predefined energy absorption level, a combination thereof, and/or the like. The lattice structure may be defined by an equation that includes constants, in which different equations may define different types of lattice structures.

According to examples, a processor may determine values of the constants in the equation that result in the surfaces of the lattice structure forming tubes. That is, for instance, the processor may evaluate the equation with multiple sets of constants until values of the constants that result in the surfaces of the lattice structure form into the tubes. In addition, the processor may determine locations at which the identified equation with the determined values of the constants intersects with defined boundaries of the digital model 204, in which the tubes may have open ends at the intersections. The processor may modify the digital model to include the lattice structure with the surfaces forming tubes and cap ends added at the determined locations to close the open edges of the tubes at the determined locations.

In many instances, 3D fabricated objects with surface-based lattice structures may not provide the objects with intended properties, such as stiffness and/or compression properties. In addition, the design of the lattice structures may require use of a great deal of computational resources as a processor may determine the locations at which each portion of the lattice structures, including the interiors of the lattice structures. Through implementation of the present disclosure, a processor may determine a lattice structure formed of tubes having capped ends. The processor may determine the lattice structure through a determination of values of constants that results in the surfaces of the lattice structure forming hollow tubes and may also determine the locations at which the ends of the tubes are to be capped.

By determining the lattice structure in this manner, the processor may not identify each point of the lattice structure that is to be formed during a 3D fabrication operation. Instead, the processor may define the lattice structure to have a minimal thickness in the digital model, which may minimize the number of points that the processor may process. In addition, the processor may add cap ends to open edges of the hollow tubes. A CAD program and/or a 3D fabrication program may interpret the closed hollow tubes as solid elements. As a result, the lattice structure with the hollow tubes may be fabricated as solid elements. In some respects, therefore, the processor disclosed herein may modify a digital model of an object to include an appropriate lattice structure in a manner that may reduce computing resource utilization as the processor may not identify each point inside of the lattice structure that is to be formed during a 3D fabrication operation of the object.

Figure 2:
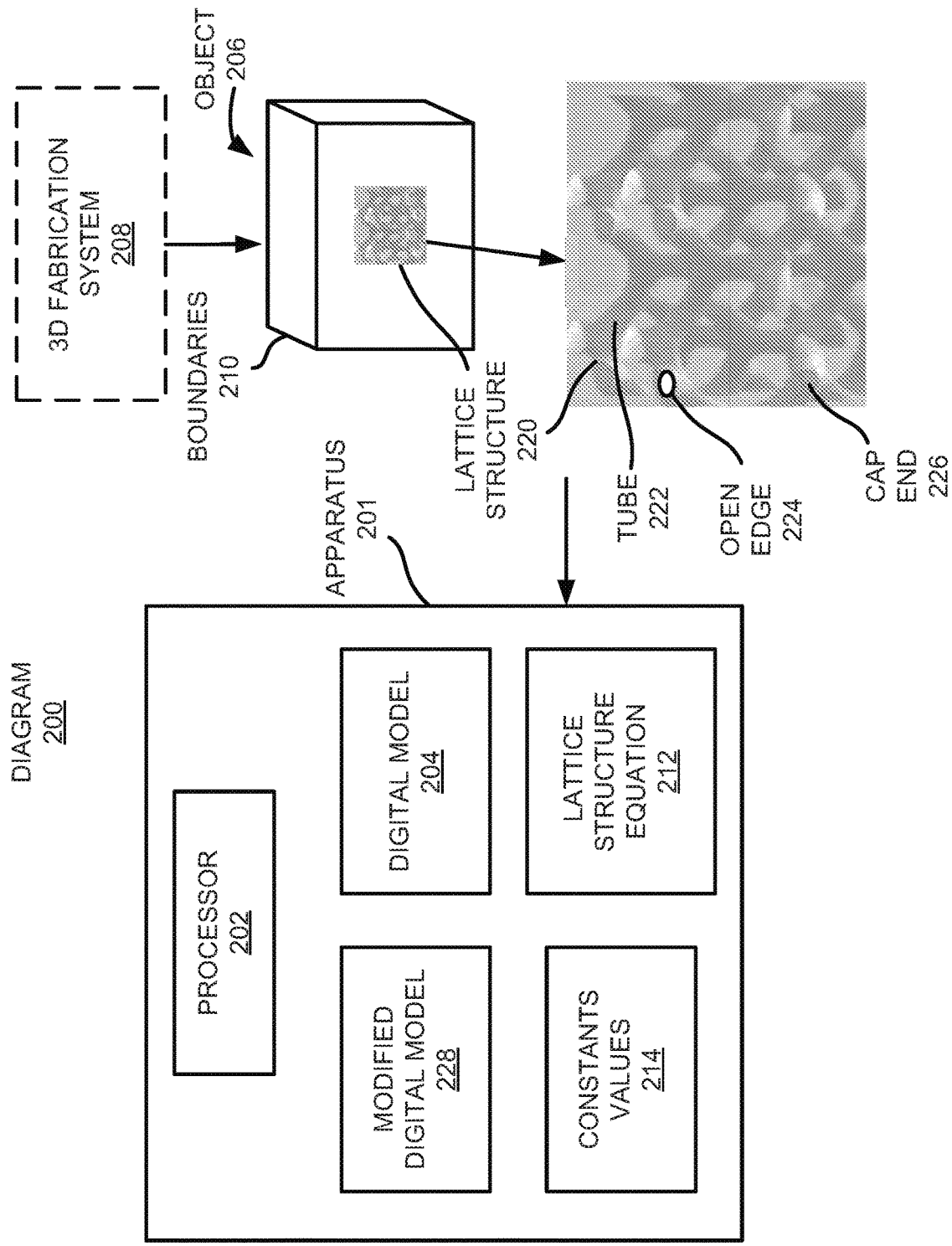
FIG. 2 shows a diagram, which includes an example processor that may execute the computer-readable instructions stored on the example computer-readable medium depicted in FIG. 1.

Reference is first made to FIGS. 1 and 2. FIG. 1 shows a block diagram of an example computer-readable medium 100 that may have stored thereon computer-readable instructions for modifying a digital model of a portion of an object to include a lattice structure with surfaces that form hollow tubes with capped ends, in which the lattice structure is to provide the object with a predefined property. FIG. 2 shows a diagram 200, which includes an example processor 202 that may execute the computer-readable instructions stored on the example computer-readable medium 100. It should be understood that the example computer-readable medium 100 depicted in FIG. 1 and/or the example processor 202 depicted in FIG. 2 may include additional attributes and that some of the attributes described herein may be removed and/or modified without departing from the scopes of the example computer-readable medium 100 and/or the example processor 202.

The computer-readable medium 100 may have stored thereon computer-readable instructions 102-112 that a processor, such as the processor 202 depicted in FIG. 2, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 202 may execute the instructions 102 to access a digital model 204 of a portion of an object 206 to be fabricated by a three-dimensional (3D) fabrication system 208. The object 206 may be any suitable type of device that may be fabricated by a 3D fabrication system 208 to have a predefined property, such as a predefined compression level. By way of particular example, the object 206 may be a shoe, a bicycle seat, a helmet, and/or the like and the portion of the object 206 may be part of a cushion for a shoe, a part of a bicycle seat, a part of a helmet, a mechanical part, and/or the like. In any of these examples, the digital model 204 may define boundaries 210 of the portion of the object 206, which may correspond to the interfaces of the portion of the object 206 with other portions of the object 206 and/or exterior surfaces of the object 206. It should be understood that the object 206 has been depicted as having a cubic shape for purposes of ease of illustration and not of limitation and that the boundaries of the object 206 may have any suitable shape without departing from a scope of the present disclosure.

The digital model 204 may be a 3D computer model of the portion of the object 206 and/or of the object 206, such as a computer aided design (CAD) file, or other digital representation of the portion of the object 206 and/or the object 206. In addition, the processor 202 may obtain (or equivalently, access, receive, or the like) the digital model 204 from a data store (not shown) or some other suitable source. In some examples, the digital model 204 may be generated using a CAD program or another suitable design program.

The processor 202 may execute the instructions 104 to identify a lattice structure 220 to be formed in an interior of the digital model 204. Generally speaking, the processor 202 may identify a lattice structure 220 that may provide the portion of the object 206 with a predefined property. As discussed herein, the portion of the object 206 may have a predefined property, such as a predefined compression level, a predefined stiffness level, a predefined porosity level, a predefined energy absorption level, a combination thereof, and/or the like. The predefined property may be based on the type of the object 206 and may be determined through testing, modeling, historical knowledge, and/or the like. For instance, the predefined property, e.g., predefined compression level, may be higher for objects that are to have greater levels of compression and may be lower for objects that are to have lower levels of compression. By way of particular example, a cushion for a shoe may have a lower predefined compression than a cushion for a bicycle seat. In addition, the processor 202 may identify lattice structures 220 that may provide different predefined properties to different portions of the object 206.

The lattice structure 220 may be defined by an equation 212 that includes constants. That is, the lattice structure 220 may be defined by an equation 212 that corresponds to a surface-based lattice structure or equivalently, a triply periodic minimal surface (TPMS) structure, such as a skeletal gyroid, and/or the like. By way of particular example, the lattice structure 220 may be defined the equation:

$$v = r*T1 + s*T2 + t. \quad \text{Equation (1):}$$

In Equation (1), r, s, and t may be constants and both T1 and T2 may be one of the right-hand sides of level surface approximations of surfaces, which may be subject to translation and scaling.

In a first example, the lattice structure 220 may be defined by the following equation:

$$v = r*(\cos(x)*\sin(y) + \cos y(y)*\cos(z) + \cos(z)*\cos(x)) - s*(\cos(x*2) + \cos(y*2) + \cos(z*2)) - t. \quad \text{Equation (2):}$$

In a second example, the lattice structure 220 may be defined by the following equation:

$$v = r*\left(\sin\left(x - \frac{\pi}{4}\right)*\sin\left(y - \frac{\pi}{4}\right)*\sin\left(z - \frac{\pi}{4}\right) + \sin\left(x - \frac{\pi}{4}\right)*\cos\left(y - \frac{\pi}{4}\right)*\cos\left(z - \frac{\pi}{4}\right) + \cos\left(x - \frac{\pi}{4}\right)*\sin\left(y - \frac{\pi}{4}\right)*\cos\left(z - \frac{\pi}{4}\right) + \cos\left(x - \frac{\pi}{4}\right)*\cos\left(y - \frac{\pi}{4}\right)*\sin\left(z - \frac{\pi}{4}\right) - s*(\cos(4*x) + \cos(4*y) + \cos(4*z) - t. \quad \text{Equation ((3)}$$

In a third example, the lattice structure 220 may be defined by the following equation:

$$v = r*(\cos(x)*\sin(y)*\cos(y)*\sin(z) + \cos(z)*\sin(x)) - s*(\cos(x)*\cos(y) + \cos(y)*\cos(z) + \cos(z)*\cos(x)) - t. \quad \text{Equation (4):}$$

The processor 202 may execute the instructions 106 to determine values of the constants 214 (e.g., r, s, and t in the equations above) that result in surfaces of the lattice structure 220 forming tubes 222. The processor 202 may also apply the values of the constants to the equation (e.g., equation (1) and any of equations (2)-(4)) to generate a lattice structure 220 with the tubes 222. In some examples, the tubes 222 of the lattice structure 220 may terminate at some locations in 3D space, e.g., the tubes 222 may not extend indefinitely. At the locations at which the tubes 222 terminate, the tubes 222 may have open edges 224. That is, application of the equation 212 to generate the lattice structure 220 with the tubes 222 may not include the generation of surfaces on the ends of the tubes 222. Accordingly, the lattice structure 220 with the tubes 222 may be represented as having hollow interiors in the digital model 204.

In some examples, the lattice structure equation 212 and the values of the constants 214 may be determined based on properties that the lattice structure 220 is predicted to have when fabricated. That is, the lattice structure equation 212 and the values of the constants 214 may be determined to cause the object 206 to have the predefined property as discussed herein. According to examples, the instructions 106 may cause the processor 202 to evaluate the equation 212 with multiple sets of constants until values of the constants that result in the surfaces of the lattice structure 220 form into the tubes 222.

The processor 202 may execute the instructions 108 to determine locations at which the identified equation 212 with the determined values of the constants 214 intersects with the defined boundaries 210 of digital model 204. That is, for instance, the processor 202 may determine the locations of the boundaries 210 of the digital model 204 in a three-dimensional (3D) space. The processor 202 may also determine the locations at which the tubes 222 of the lattice structure 220 identified by the equation 212 having the determined values of the constants 214 are positioned in the 3D space. In addition, the processor 202 may determine locations at which the tubes 222 of the lattice structure 220 intersect with the boundaries 210 in the 3D space. That is, the processor 202 may determine the intersecting locations as locations at which the open edges 224 of the tubes 222 of the lattice structure 220 intersect with the boundaries 210 of the digital model 204 of the object 206.

The processor 202 may execute the instructions 110 to modify the digital model 204 to include the lattice structure 220 with the surfaces forming tubes 222 and cap ends 226 added at the determined locations to close the open edges 224 of the tubes 222 at the determined locations. That is, the processor 202 may generate a modified digital model 228 to add the cap ends 226 to the digital model 204 to close the open edges 224.

In some examples, the 3D fabrication system 208 may fabricate the portion of the object 206 according to the modified digital model 228. For instance, the processor 202 may send the modified digital model 228 to a controller or processor of the 3D fabrication system 208, which may process or otherwise use the modified digital model 228 to fabricate the portion of the object 206 and/or the entire object 206. In other examples, the processor 202 may be the controller or processor of the 3D fabrication system 208 and may control components of the 3D fabrication system 208 to fabricate the object 06 according to the modified digital model 228.

According to examples, the processor 202 may execute the instructions 112 to send control signals to the 3D fabrication system 208 to fabricate the portion of the object 206 (and/or the object 206) according to the modified digital model 228. The processor 202, for instance, may send control signals to fabrication components (not shown) of the 3D fabrication system 208 to fabricate the portion of the object 206 (and/or the object 206). In some examples, the fabrication components may include a spreader that may spread build material particles into layers and a deposition mechanism that may deposit a binding and/or fusing agent onto the layers of build material particles. In these examples, the processor 202 may send control signals to the deposition mechanism to selectively deposit the binding and/or fusing agent to fabricate the portion of the object 206 according to the modified digital model 228.

The 3D fabrication system 208 may be any suitable type of additive manufacturing system. Examples of suitable additive manufacturing systems may include systems that may employ curable binder jetting onto build materials (e.g., thermally or UV curable binders), ink jetting onto build materials, selective laser sintering, stereolithography, fused deposition modeling, etc. In a particular example, the 3D fabrication system 208 may form the portion of the object 206 by binding and/or fusing build material particles together. In any of these examples, the build material particles may be any suitable type of material that may be employed in 3D fabrication processes, such as, a metal, a plastic, a nylon, a ceramic, an alloy, and/or the like.

According to examples, the portion of the object 206 may be fabricated from a predefined type of build material and the identified lattice structure 220 is to cause the object 206 fabricated from the predefined type of build material to have the predefined property when the object 206 is fabricated to include an interior that corresponds to the modified digital model 228. As discussed herein, the predefined property may be a predefined compression level, a predefined stiffness level, a predefined porosity level, a predefined energy absorption level, a combination thereof, and/or the like.

As discussed herein, the tubes 222 of the lattice structure 220 may be hollow when they are generated and the cap ends 226 that are added to the open edges 224 of the tubes 222 are to close the open edges 224 of the tubes 222. In some examples, a computer aided design program may interpret the closed tubes as solid elements and thus, when the object 206 is fabricated, the object 206 may be fabricated to include solidly formed lattice structures 220. In addition or alternatively, a 3D fabrication program, e.g., a program that may control the fabrication components of the 3D fabrication system 208, may interpret the closed tubes as solid elements and to cause the lattice structure 220 to be fabricated as solid elements in the object 206. As a result, the processor 202 may not have to modify the digital model 228 of the object 206 to fill in the hollow tubes 222 in order for the object 206 to be fabricated to include solid lattice structures 220. In other examples, however, the processor 202 may modify the digital model 228 to add fillers inside of the closed tubes.

In some examples, the processor 202 may be part of an apparatus 201, which may be a computing system such as a server, a laptop computer, a tablet computer, a desktop computer, or the like. The processor 202 may be a semiconductor-based microprocessor, a central processing unit (CPU), an application specific integrated circuit (ASIC), a field-programmable gate array (FPGA), and/or other suitable hardware device. The apparatus 201 may also include a memory that may have stored thereon computer-readable instructions (which may also be termed computer-readable instructions) that the processor 202 may execute. The memory may be an electronic, magnetic, optical, or other physical storage device that contains or stores executable instructions. The memory may be, for example, Random Access memory (RAM), an Electrically Erasable Programmable Read-Only Memory (EEPROM), a storage device, an optical disc, and the like. The memory, which may also be referred to as a computer-readable storage medium, may be a non-transitory computer-readable storage medium, where the term "non-transitory" does not encompass transitory propagating signals.

Figure 3:
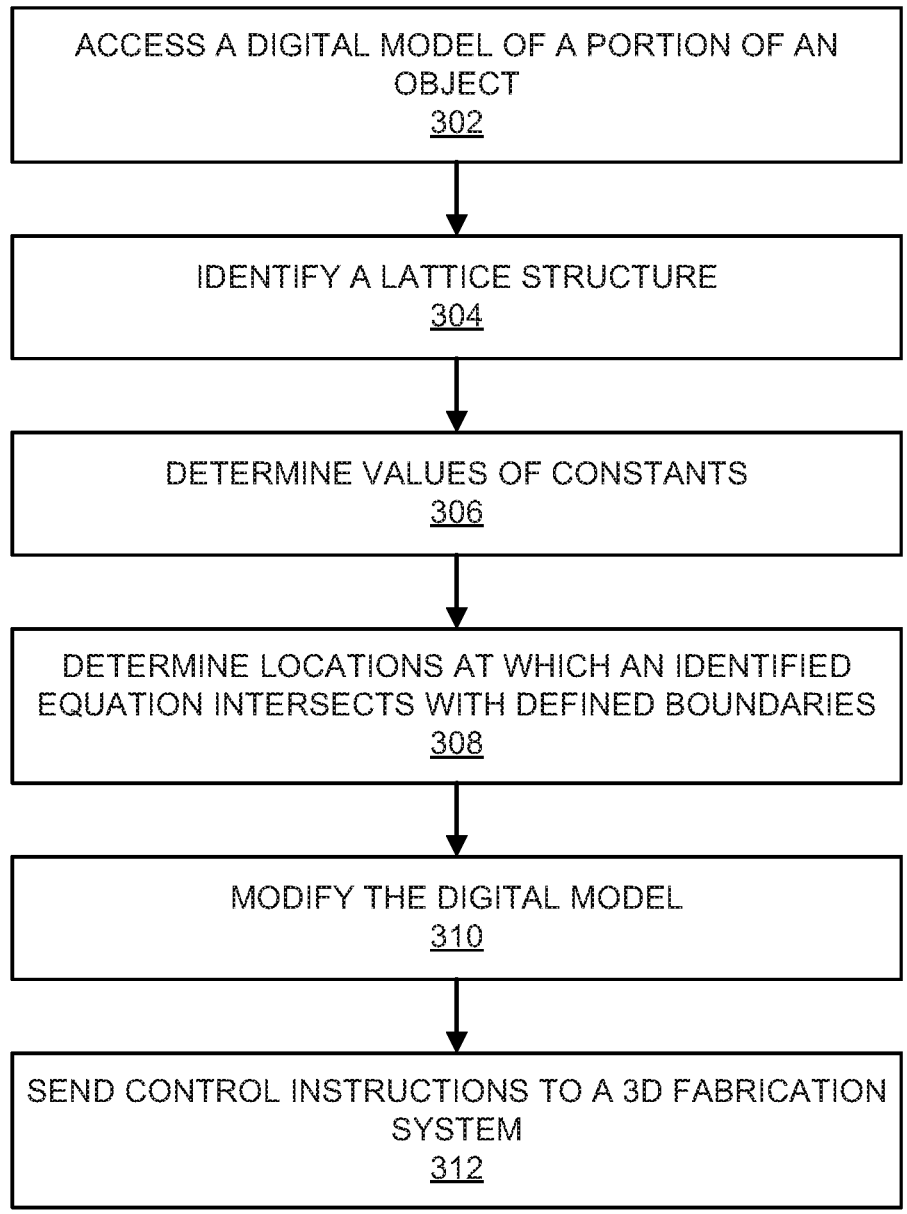
FIG. 3 shows a flow diagram of an example method for modifying a digital model of a portion of an object to include a lattice structure having surfaces forming tubes and cap ends at boundaries of the digital model, in which the lattice structure is to cause the portion of the object to have a predefined property when fabricated by a 3D fabrication system.

Turning now to FIG. 3, there is shown a flow diagram of an example method 300 for modifying a digital model 204 of a portion of an object 206 to include a lattice structure 220 having surfaces forming tubes 222 and cap ends 226 at boundaries 210 of the digital model 204, in which the lattice structure 220 is to cause the portion of the object 206 to have a predefined property when fabricated by a 3D fabrication system 208. It should be understood that the method 300 depicted in FIG. 3 may include additional operations and that some of the operations described therein may be removed and/or modified without departing from the scope of the method 300. The description of the method 300 is also made with reference to the features depicted in FIGS. 1 and 2 for purposes of illustration. Particularly, the processor 202 depicted in FIG. 2 may execute some or all of the operations included in the method 300.

At block 302, the processor 202 may access a digital model 204 of a portion of an object 206 to be fabricated by a three-dimensional (3D) fabrication system 208. As discussed herein, the digital model 204 may define boundaries 210 of the portion of the object 206. At block 304, the processor 202 may identify a lattice structure 220 to be formed in an interior of the digital model 204, in which the identified lattice structure 220 is to provide the portion of the object 206 with a predefined property and is defined by an equation 212 that includes constants. As discussed herein, the lattice structure 220 may be a surface-based lattice structure or equivalently, a TPMS structure. Examples of equations 212 for suitable types of lattice structures 220 are described herein.

At block 306, the processor 202 may determine values of the constants that result in surfaces of the lattice structure 220 forming tubes 222. As shown in FIG. 2, a plurality of the tubes 222 in the lattice structure 220 may have open edges 224. The open edges 224 of the tubes 222 may correspond to the locations at which the tubes 222 intersect with the defined boundaries 210 of the digital model 204. Otherwise, the tubes 222 may extend indefinitely in 3D space.

At block 308, the processor 202 may determine locations at which the identified equation 212 with the determined values of the constants intersects with the defined boundaries 210. As discussed herein, the identified equation 212 with the determined values of the constants may define points in a three-dimensional space that are occupied by the surfaces of the surface-based lattice structure. Likewise, the defined boundaries 210 may be defined with the 3D space. In addition, the processor 202 may determine the locations at which the identified equation intersects with the defined boundaries 210 in the three-dimensional space.

At block 310, the processor 202 may modify the digital model 204 to include the lattice structure 220 with the surfaces forming tubes 222 and cap ends 226 added at the determined locations to close the open edges 224 of the tubes 222 at the determined locations. As discussed herein, a 3D fabrication program may interpret the closed tubes as solid elements and may implement the modified digital model 228 with the closed tubes to fabricate the portion of the object 206 to have the lattice structure 220 having the solid elements.

At block 312, the processor 202 may send control instructions to the 3D fabrication system 208 to fabricate the object 206 according to the modified digital model 228 to cause the portion of the object 206 to be fabricated to have the predefined property. As discussed herein, the processor 202 may directly control the 3D fabrication system 208 or may send the control instructions to a controller of the 3D fabrication system 208. In addition, the predefined property may include a predefined compression level, a predefined stiffness level, a predefined porosity level, a predefined energy absorption level, a combination thereof, and/or the like.

As discussed herein, the portion of the object 206 may be fabricated from a predefined type of build material and the identified lattice structure may cause the object 206 fabricated from the predefined type of build material to have the predefined property when the portion of the object 206 is fabricated to include an interior that corresponds to the modified digital model 228.

Some or all of the operations set forth in the method 300 may be contained as utilities, programs, or subprograms, in any desired computer accessible medium. In addition, the method 300 may be embodied by computer programs, which may exist in a variety of forms. For example, the method 300 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
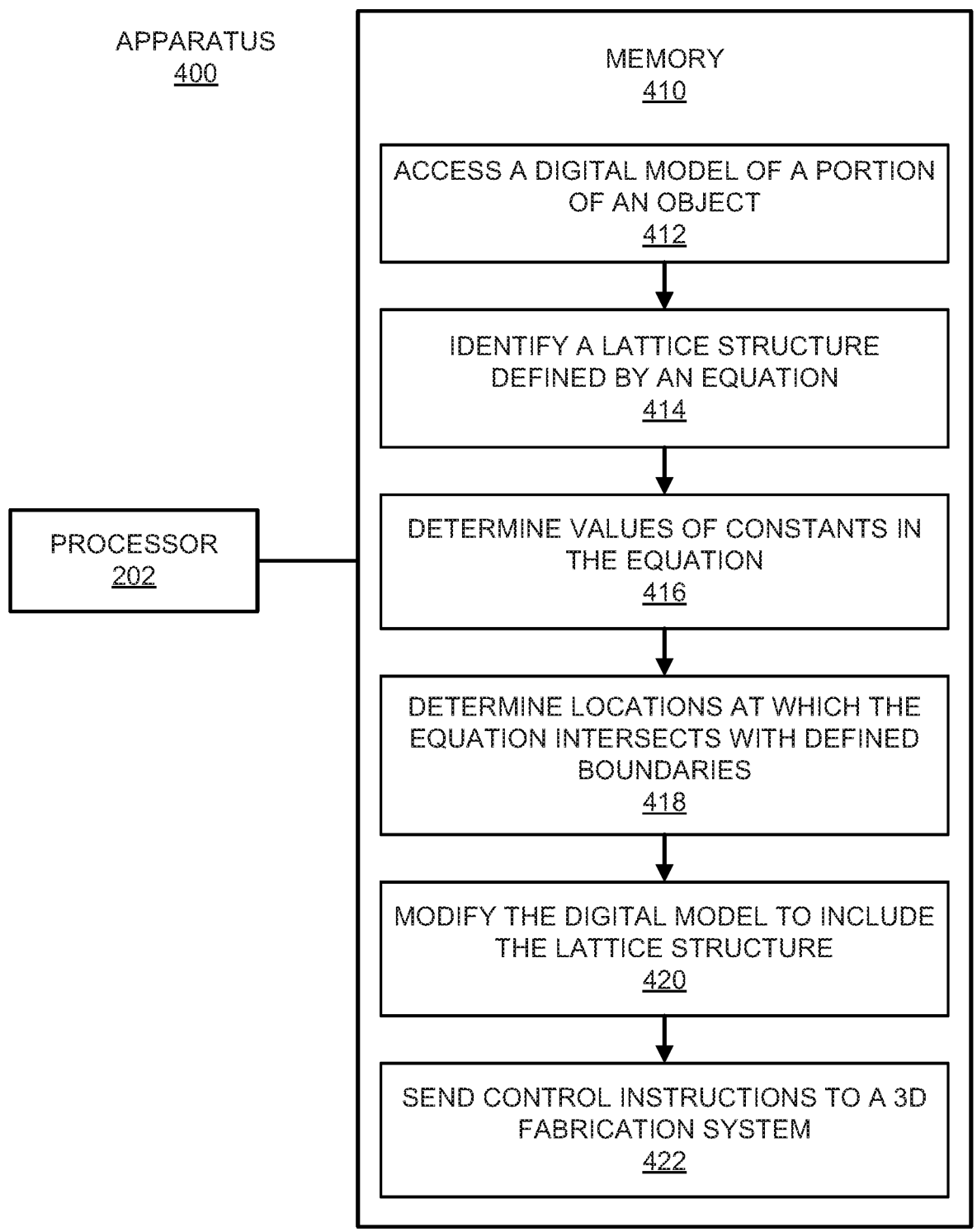
FIG. 4 shows a block diagram of an example apparatus that may modify a digital model of a portion of an object to include a lattice structure having surfaces forming tubes and cap ends at boundaries of the digital model, in which the lattice structure is to cause the portion of the object to have a predefined property when fabricated by a 3D fabrication system.

Reference is now made to FIG. 4, which shows a block diagram of an example apparatus 400 that may modify a digital model 204 of a portion of an object 206 to include a lattice structure 220 having surfaces forming tubes 222 and cap ends 226 at boundaries 210 of the digital model 204, in which the lattice structure 220 is to cause the portion of the object 206 to have a predefined property when fabricated by a 3D fabrication system 208. It should be understood that the example apparatus 400 depicted in FIG. 4 may include additional features and that some of the features described herein may be removed and/or modified without departing from the scopes of the apparatus 400. The description of the apparatus 400 is made with reference to FIGS. 1-3 for purposes of illustration.

The apparatus 400 may be a computing system such as a laptop computer, a tablet computer, a desktop computer, a smartphone, or the like. As shown, the apparatus 400 may include the processor 202. The apparatus 400 may also include a memory 410 that may have stored thereon machine-readable instructions (which may equivalently be termed computer-readable instructions) that the processor 202 may execute. The memory 410 may be an electronic, magnetic, optical, or other physical storage device that contains or stores executable instructions. The memory 410 may be, for example, Random-Access memory (RAM), an Electrically Erasable Programmable Read-Only Memory (EEPROM), a storage device, an optical disc, and the like. The memory 410, which may also be referred to as a computer-readable storage medium, may be a non-transitory machine-readable storage medium, where the term "non-transitory" does not encompass transitory propagating signals.

As shown in FIG. 4, the memory 410 may have stored thereon machine-readable instructions 412-422 that the processor 202 may execute. Although the instructions 412-422 are described herein as being stored on the memory 410 and may thus include a set of machine-readable instructions, the apparatus 400 may include hardware logic blocks that may perform functions similar to the instructions 412-422. For instance, the processor 202 may include hardware components that may execute the instructions 412-422. In other examples, the apparatus 400 may include a combination of instructions and hardware logic blocks to implement or execute functions corresponding to the instructions 412-422. In any of these examples, the processor 202 may implement the hardware logic blocks and/or execute the instructions 412-422. As discussed herein, the apparatus 400 may also include additional instructions and/or hardware logic blocks such that the processor 202 may execute operations in addition to or in place of those discussed above with respect to FIG. 4.

The processor 202 may execute the instructions 412 to access a digital model 204 of a portion of an object 206 to be fabricated by a three-dimensional (3D) fabrication system 208. The digital model 204 may define boundaries 210 of the portion of the object 206. The processor 202 may execute the instructions 414 to identify a lattice structure 220 to be formed in an interior of the digital model 204, in which the identified lattice structure 220 is to cause the portion of the object 206 to have a predefined property and is defined by an equation 212 that includes constants. The predefined property may be a predefined compression level, a predefined stiffness level, a predefined porosity level, a predefined energy absorption level, a combination thereof, and/or the like.

The processor 202 may execute the instructions 416 to determine values of the constants that result in points in a 3D space at which surfaces of the lattice structure 220 are formed into tubes 222, in which a plurality of the tubes 222 have open edges 224. For instance, the processor 202 may evaluate the equation 212 with multiple sets of constants until values of the constants that result in the surfaces of the lattice structure 220 form into the tubes 222 are determined.

The processor 202 may execute the instructions 418 to determine locations at which the identified equation 212 with the determined values of the constants intersects with the defined boundaries 210. The open edges 224 of the tubes 222 may correspond to the locations at which the tubes 222 of the lattice structure 220 intersect with the defined boundaries 210.

The processor 202 may execute the instructions 420 to modify the digital model 204 to include the lattice structure with the surfaces forming tubes 222 and cap ends 226 added at the determined locations to close the open edges 224 of the tubes 222 at the determined locations. In addition, the processor 202 may execute the instructions 422 to send control instructions to the 3D fabrication system 208 to fabricate the object 206 according to the modified digital model 228 to cause the object 206 to be fabricated to have the predefined property.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium on which is stored computer-readable instructions, that when executed by a processor, cause the processor to:
   access a digital model of a portion of an object, the digital model defining boundaries of the portion of the object;
   identify a lattice structure to be formed in an interior of the digital model, wherein the identified lattice structure is to provide the portion of the object with a predefined property and is defined by an equation that includes constants;
   determine values of the constants that result in surfaces of the lattice structure forming tubes, wherein a plurality of the tubes have open edges;
   determine locations at which the identified equation with the determined values of the constants intersects with the defined boundaries; and
   modify the digital model to include the lattice structure with the surfaces forming tubes and cap ends added at the determined locations to close the open edges of the tubes at the determined locations, wherein the portion of the object is to be fabricated by a three-dimensional (3D) fabrication system according to the modified digital model to have the predefined property.

2. The non-transitory computer-readable medium of claim 1, wherein the lattice structure is a surface-based lattice structure.

3. The non-transitory computer-readable medium of claim 1, wherein the portion of the object is to be fabricated from a predefined type of build material and wherein the identified lattice structure is to cause the portion of the object fabricated from the predefined type of build material to have the predefined property when the portion of the object is fabricated to include an interior that corresponds to the modified digital model.

4. The non-transitory computer-readable medium of claim 1, wherein the tubes are hollow and wherein the cap ends close the open edges of the tubes, and wherein a computer aided design program is to interpret the closed tubes as solid elements.

5. The non-transitory computer-readable medium of claim 1, wherein the tubes are hollow and wherein the cap ends close the open edges of the tubes, and wherein a three-dimensional fabrication program is to interpret the closed tubes as solid elements and to cause the closed tubes of the lattice structure to be fabricated as solid elements of the object.

6. The non-transitory computer-readable medium of claim 1, wherein the instructions are to cause the processor to evaluate the equation with multiple sets of constants until values of the constants that result in the surfaces of the lattice structure form into the tubes.

7. The non-transitory computer-readable medium of claim 1, wherein the identified equation with the determined values of the constants defines points in a three-dimensional space that are occupied by the surfaces of the lattice structure and wherein the instructions are to cause the processor to determine the locations at which the identified equation intersects with the boundaries in the three-dimensional space.

8. The non-transitory computer-readable medium of claim 1, wherein the instructions are to cause the processor to send control instructions to the 3D fabrication system to fabricate the object according to the modified digital model to provide the object to be fabricated with the predefined property, wherein the predefined property comprises a predefined compression level, a predefined stiffness level, a predefined porosity level, a predefined energy absorption level, and/or a combination thereof.

9. A method comprising:
   accessing, by a processor, a digital model of a portion of an object to be fabricated by a three-dimensional (3D) fabrication system, the digital model defining boundaries of the portion of the object;

identifying, by the processor, a lattice structure to be formed in an interior of the digital model, wherein the identified lattice structure is to cause the portion of the object to have a predefined property and is defined by an equation that includes constants;

determining, by the processor, values of the constants that result in surfaces of the lattice structure forming tubes, wherein a plurality of the tubes have open edges;

determining, by the processor, locations at which the identified equation with the determined values of the constants intersects with the defined boundaries;

modifying, by the processor, the digital model to include the lattice structure with the surfaces forming tubes and cap ends added at the determined locations to close the open edges of the tubes at the determined locations; and sending, by the processor, control instructions to the 3D fabrication system to fabricate the portion of the object according to the modified digital model to cause the portion of the object to be fabricated to have the predefined property.

10. The method of claim 9, wherein the identified equation with the determined values of the constants defines points in a three-dimensional space that are occupied by the surfaces of the lattice structure and wherein the instructions are to cause the processor to determine the locations at which the identified equation intersects with the defined boundaries in the three-dimensional space.

11. The method of claim 9, wherein the predefined property comprises a predefined compression level, a predefined stiffness level, a predefined porosity level, a predefined energy absorption level, and/or a combination thereof.

12. The method of claim 11, wherein the portion of the object is to be fabricated from a predefined type of build material and wherein the identified lattice structure is to cause the portion of the object fabricated from the predefined type of build material to have the predefined property when the portion of the object is fabricated to include an interior that corresponds to the modified digital model.

13. The method of claim 9, further comprising:

wherein a 3D fabrication program is to interpret the closed tubes as solid elements and to implement the modified digital model with the closed tubes to fabricate the portion of the object to have the lattice structure having the solid elements.

14. An apparatus comprising:

a processor; and a memory on which is stored machine-readable instructions that are to cause the processor to:

access a digital model of a portion of an object to be fabricated by a three-dimensional (3D) fabrication system, the digital model defining boundaries of the portion of the object;

identify a lattice structure to be formed in an interior of the digital model, wherein the identified lattice structure is to cause the portion of the object to have a predefined property and is defined by an equation that includes constants;

determine values of the constants that result in points in a 3D space at which surfaces of the lattice structure are formed into tubes, wherein a plurality of the tubes have open edges;

determine locations at which the identified equation with the determined values of the constants intersects with the defined boundaries;

modify the digital model to include the lattice structure with the surfaces forming tubes and cap ends added at the determined locations to close the open edges of the tubes at the determined locations; and send control instructions to the 3D fabrication system to fabricate the portion of the object according to the modified digital model to cause the portion of the object to be fabricated to have the predefined property.

15. The apparatus of claim 14, wherein the instructions are further to cause the processor to:

evaluate the equation with multiple sets of constants until values of the constants that result in the surfaces of the lattice structure form into the tubes are identified.

* * * * *